T. J. GANNON.
VALVE FOR FLUSH TANKS.
APPLICATION FILED AUG. 31, 1915.

1,304,303.

Patented May 20, 1919.
3 SHEETS—SHEET 1.

WITNESSES

INVENTOR
Thomas J. Gannon

BY
ATTORNEY

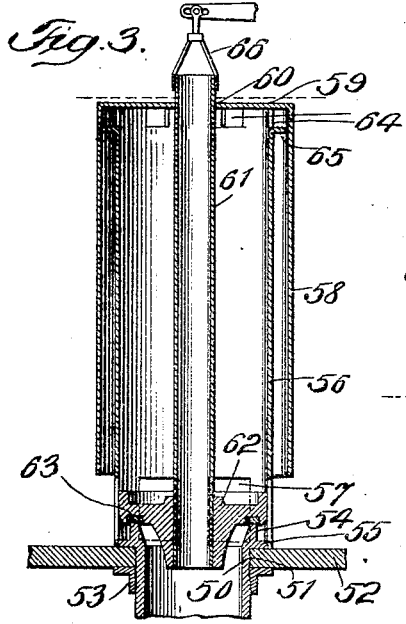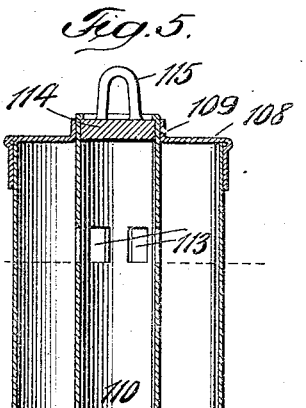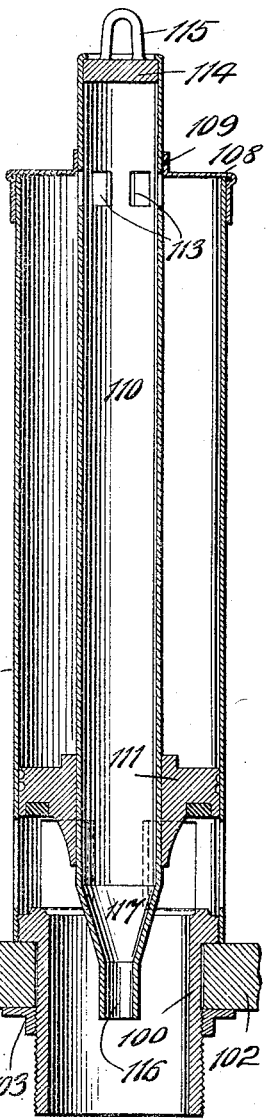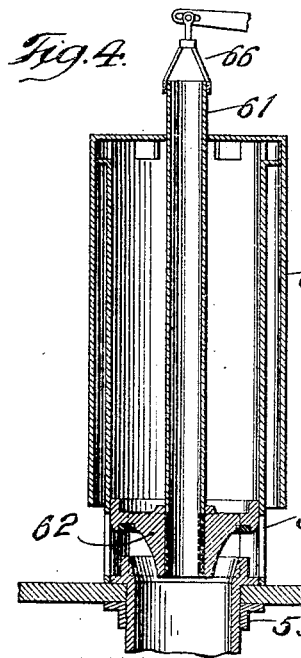

T. J. GANNON.
VALVE FOR FLUSH TANKS.
APPLICATION FILED AUG. 31, 1915.
1,304,303.
Patented May 20, 1919.
3 SHEETS—SHEET 3.
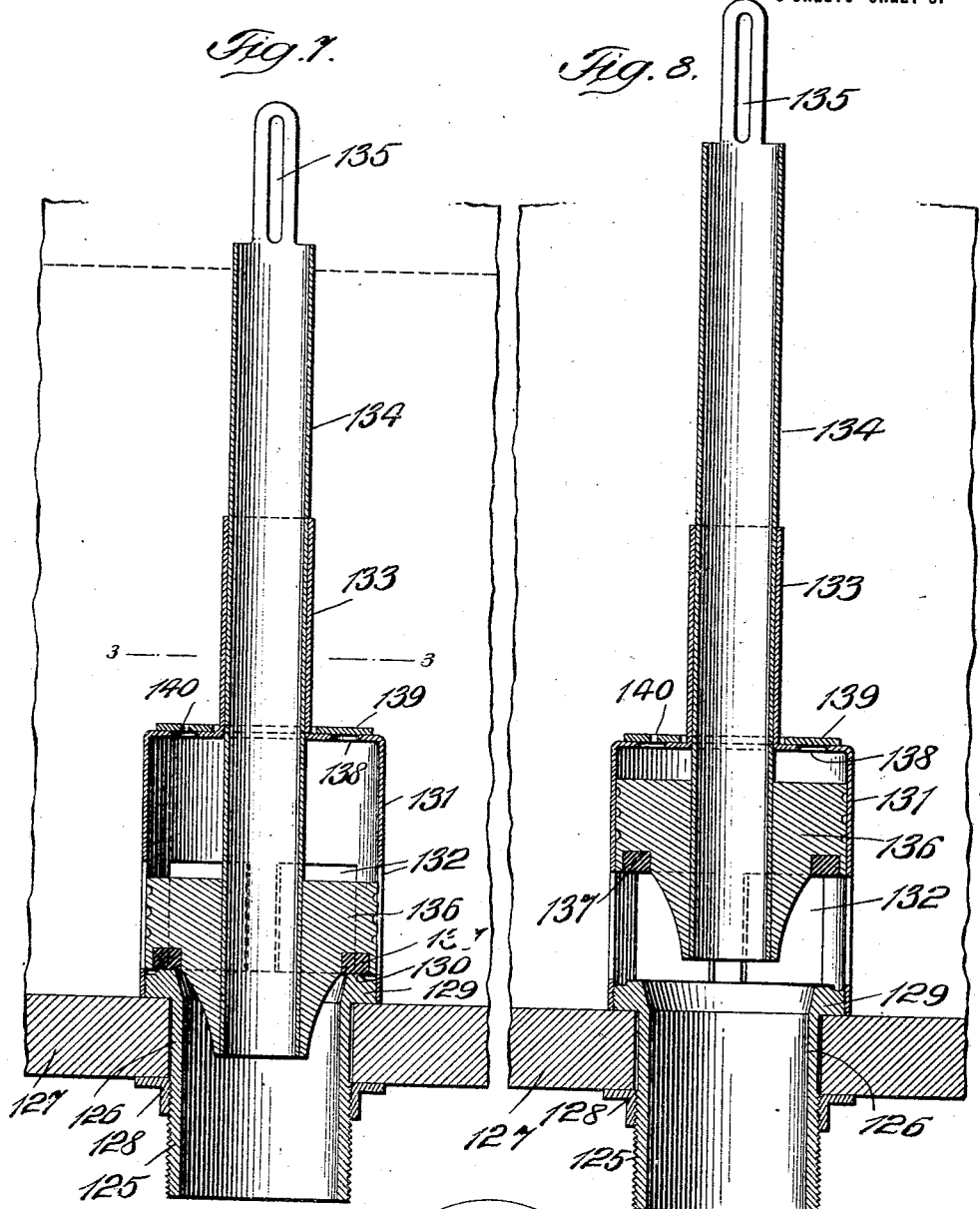

UNITED STATES PATENT OFFICE.

THOMAS J. GANNON, OF BROOKLYN, NEW YORK.

VALVE FOR FLUSH-TANKS.

1,304,303.             Specification of Letters Patent.      Patented May 20, 1919.

Application filed August 31, 1915. Serial No. 48,156.

*To all whom it may concern:*

Be it known that I, THOMAS J. GANNON, a citizen of the United States, and a resident of New York, in the borough of Brooklyn, county of Kings, and State of New York, have invented certain new and useful Improvements in Valves for Flush-Tanks, of which the following is a specification.

This invention relates to improvements in valves for flush tanks, and has for an object to provide an improved valve of this character, which will automatically remain open after having been operated, for a sufficient period to empty the tank, without requiring continued pressure on the operating means. Another object is to provide such a device which will be extremely simple in construction and inexpensive to manufacture, and which will be noiseless in operation.

With these and other objects in view, my invention is shown in the accompanying drawing, and will be hereinafter more fully described with reference thereto and finally pointed out in the claims.

In the drawings,

Fig. 3 is a vertical section of a modified form of construction in closed position;

Fig. 4 is a similar view thereof in open position;

Fig. 5 is a vertical section of a further modified form in closed position;

Fig. 6 is a similar view of the same in open position;

Fig. 7 is a vertical sectional view of a still further modified form of my invention in closed position;

Fig. 8 is a similar view of the same in closed position; and

Fig. 9 is a horizontal section on the line 9—9 of Fig. 7.

Similar reference characters indicate corresponding parts throughout the several figures of the drawings.

Figure 1:
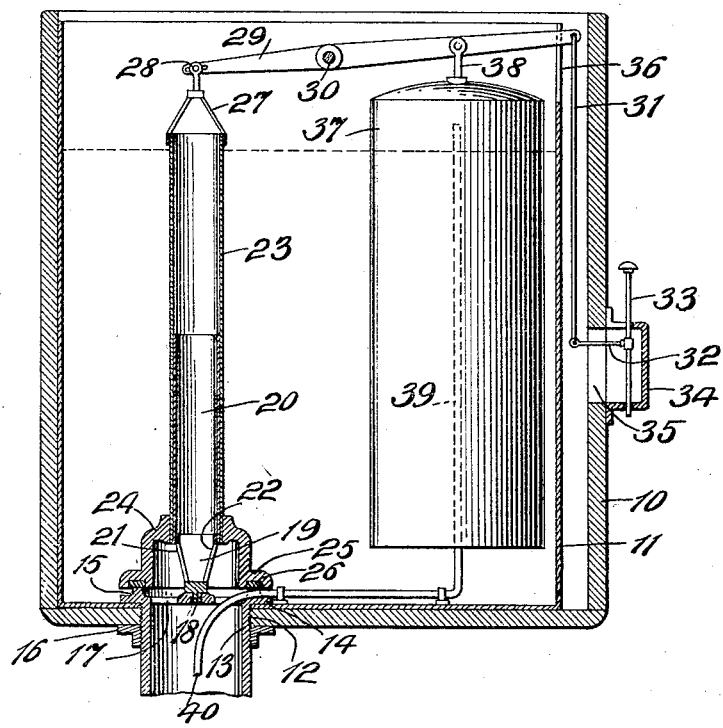
Figure 1 is a vertical sectional view of my improved valve in closed position.

Referring to the drawings, my invention comprises a tank 10 of wood, porcelain, or the like, having an inner water-tight tank 11 of metal spaced therefrom at the front, and provided at the under-side with an opening 12, in which is secured a bushing 13 having a laterally extending flange portion 14 at the upper edge thereof, provided with a lip portion 15, and held within the said opening by means of a ring 16 threaded thereon. A spider 17 is arranged within the said bushing at the upper end thereof, and is provided centrally with a threaded opening, into which is screwed the lower end 18 of a supporting member 19, to the top of which is secured a tubular guide rod 20. The supporting member 19 is in the shape of an inverted truncated cone and is provided with enlarged openings 21 and 22 for permitting water to enter the guide rod 20. A tubular member 23 is mounted on the guide rod 20, slidable vertically thereon, and extending slightly above the water level in the tank. A weighted closure member 24, preferably constructed of non-corrodible metal, is provided at the lower end, and a flanged portion 25 thereof rests on the lip 15 of the bushing 13 in closed position of the valve. The said flanged portion is provided with a circular inset of rubber or the like 26 for establishing a water-tight connection when closed. A bail 27 is arranged at the upper end of the tubular member 23, and is supported within a slotted portion 28 at the inner end of a lever 29 pivoted at 30. The outer end of the said lever is connected by means of a rod 31 to an inwardly-extending arm 32 of a plunger 33 operating in a casing 34 at the front of the tank, an opening 35 being provided in the tank to permit movement of the arm 32. The inner tank 11 is also provided with a cut-out portion 36 to permit operation of the lever 29. It will be seen that when pressure is applied to the plunger 33, the inner end of the lever 29 is lifted and the tubular member 23 is raised from its seat, allowing water to flow into the flush pipe. Any approved form of operating means, it will be understood, may be employed instead of the form shown.

A hollow bell-jar shaped member 37 is supported intermediately of the outer arm of the lever 29 by means of a rod 38. To permit the escape of air during operation of the valve, as will be hereinafter described, a tube 39 is provided, which extends upwardly in the said member 37 above the level of water in the tank, its lower end extending along the bottom of the tank through the lip 15 of the bushing and downwardly into the flush pipe for a short distance as at 40.

Figure 2:
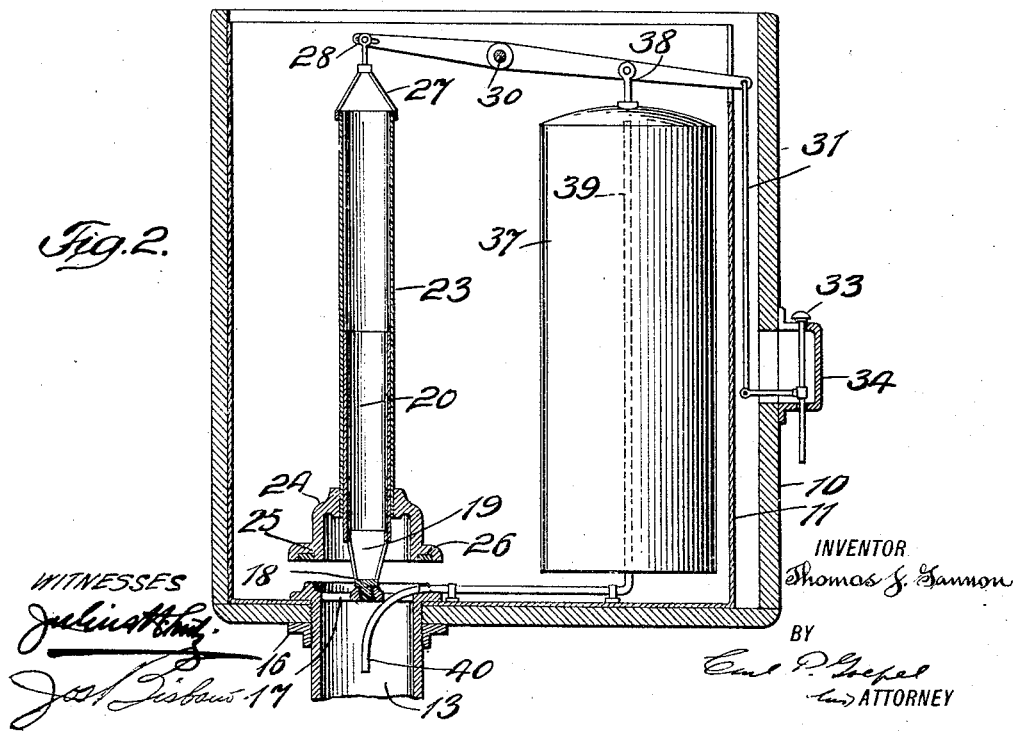
Fig. 2 is a similar view thereof in open position.

When the valve is raised as above pointed out, the member 37 is forced downwardly to the position shown in Fig. 2, the pipe 39 permitting the escape of air during the initial movement. As the water continues to drop downwardly in the tank, a partial vacuum is created in the member 37, and as the water flows past the end of the tube 39 in the flush pipe, a siphon effect is produced, which tends to exhaust the remaining air in the member 37, causing an increased vacuum, which serves to hold the member 37 in lowered position and the valve open.

When the water in the tank reaches the lower end of the member 37, air immediately enters beneath the lower edge thereof breaking the vacuum and releasing the water therefrom, and the said member is raised to its upper position, at the same time slowly closing the valve. As the tank is again filled with water, the pipe 39 permits the escape of air from the member 37. The water released from the member 37 causes an after-flushing effect, which also aids in the slow closing of the valve. If desired, a small valve or bleeder opening may be provided in the top of the member 37 to coöperate with the tube 39 in releasing air therefrom.

In the modified form of construction shown in Figs. 3 and 4, the same principle is compacted into a single structure. A bushing 50, somewhat similar to the bushing 13 of the first form of my invention, is secured into an opening 51 of the tank 52 by means of a ring 53 threaded thereon. The upstanding lip 54 of the laterally extending flange 55 is provided with an inclined inner wall extending inwardly to the inner wall of the bushing. A cylindrical member 56 is secured at its lower end to the flange 55 and is provided at its lower portion with a plurality of enlarged openings or ports 57. Inclosing the member 56, and annularly spaced therefrom, there is provided a cylindrical member 58 extending at its lower end to the top of the openings 57. The top 59 of the member 58 extends across the top of the member 56 and is provided centrally with an opening 60 in which is slidably mounted the hollow valve stem or overflow rod 61. A weighted closure member 62 is provided on the lower end of the rod 61, the sides of which snugly engage the inner surface of the member 56. A circular inset of rubber or the like 63 is provided on the under-side of the member 62, which in closed position of the valve engages the lip 54 and establishes a water-tight connection.

A plurality of spaced openings 64 are provided in the member 56 adjacent the top 59, the material cut from the said member to form the openings being preferably bent outwardly as at 65 to engage the member 58 and hold the same in the proper position. A bail 66 is secured to the top of the central overflow rod 61, which is connected to any suitable means for operating the valve. When the valve is raised from the position shown in Fig. 3 to that shown in Fig. 4, the closure member 62 is lifted from its seat, opening the ports 57 so that the water in the tank will flow into the flush pipe. At the initial movement of the valve, a portion of the water within the cylinder 56 is displaced through the openings 64, passing through the space between the two cylinders, and into the flush pipe. As the water drops in the tank, a sucking action or vacuum is created within the cylinder 58, balancing a column of water in the members 56 and 58, which in addition to the lifting pressure of the water passing from the tank into the flush pipe upon the under surface of the closure member 62, holds the valve in open position, until the water reaches the lower edge of the cylinder 58, whereupon air enters the same, breaking the vacuum and causing the valve to slowly descend. As the water still in the tank, and the water previously held within the cylinder 56 and which now flows through the ports 57 and into the flush pipe, prevents a quick dropping of the valve upon its seat, a noiseless closing of the valve takes place. The ball cock controlling the supply of water to the tank, it will be understood may be regulated in accordance with this action.

In the further modified form shown in Figs. 5 and 6, a bushing 100 is secured into an opening 101 of the flush tank 102, by means of a ring 103 screwed thereon, and an upstanding cylindrical member 104 is secured to the lateral flange 105 thereof, a lip 106 being provided on the said flange, as in the foregoing forms of construction. A number of enlarged openings 107 are provided in the cylindrical member 104 adjacent the flange 105, sufficient material being left between the openings to substantially support the said member. A cap 108 is provided on the member 104, having a central opening 109 therein in which is guided a tubular overflow rod 110 on which is supported a weighted closure member 111, provided with a circular inset of rubber or the like 112 which engages the lip portion 106 of the bushing in closed position of the valve to establish a water-tight connection. Openings 113 are provided in the rod 110 below the upper end thereof, which is made air-tight by means of a plug 114 inserted therein. A bail 115 is arranged on the said plug for raising the valve in the usual manner. The lower end of the rod is contracted as at 116 and extends downwardly into the flush pipe. The intermediate portion 117 between the contracted end 116 and the body portion of the rod is funnel shaped, and the outer surface is substantially continuous with the inclined bottom 118 of the closure member 111. Peripheral grooves 119 are provided in the said closure member, in which a water packing is formed in open position of the valve, The operation of this form of my improved valve is as follows: When the valve is raised from the position shown in Fig. 5 to that of Fig. 6, the valve is opened so that the water in the tank begins to flow into the flush tank, and at the same time the water forced upwardly in the cylinder 104 by the upward movement of the closure member, overflows into the rod 110 and into the flush pipe. The valve is held in raised position by the lifting pressure exerted on the inclined surfaces 117 and 118, and by the "sucking" or siphoning effect in the rod 110 caused by the water flowing past the end 116 thereof. When the water drops below the under surface of the closure member 111, the valve begins to close slowly by reason of the decreasing lifting pressure, and as this closing action continues, the water held in the cylinder 104 is allowed to escape through the openings 107 and into the flush pipe. During this action there is still the siphoning action in the rod 110, which also tends to prevent the quick dropping of the closure member. When the water is exhausted from the tank, the closure member seats on the lip 106 noiselessly.

In Figs. 7 to 9, I have shown a still further and more simplified form of my invention. A bushing or spud 125 is secured within an opening 126 of the flush tank 127 in the usual manner by means of a ring 128 threaded thereon, the lateral flange 129 of the said bushing being provided with an upstanding lip portion 130. A comparatively short casing 131 is secured to the lateral flange 129 and is provided adjacent the said flange with a plurality of enlarged openings 132, and on the top thereof there is provided an upstanding sleeve 133 in which is guided a vertical overflow rod 134. A slotted portion 135 is provided on the upper end of the said rod, which may be secured to any suitable operating means, for opening the valve, as hereinafter more fully described, the slot permitting the said means to return to its normal position after being operated, while the valve remains open. At the lower end of the overflow rod, a closure member or plunger 136 is provided which is inclosed by the casing 131 and in closed position of the valve seats on the lip 130, a circular inset of rubber or the like 137 being provided therein for establishing a water-tight connection. The upper side of the casing 131 is provided with a plurality of openings or ports 138, and a flat closure ring 139 rests thereon. A number of smaller or bleeder openings 140 are arranged in the said ring in such manner that one or two of them will always be in register with the openings 138.

The operation of this form of my improved valve is as follows: When the plunger or closure member 136 is raised from the closed position indicated in Fig. 7, to the position shown in Fig. 8, the water in the casing is displaced and discharged through the openings 138, the force of the water lifting the ring 139. The water in the tank then passes through the openings 132 and into the flush pipe (not shown). The valve or ring 139 closes by the weight of the water in the tank and of the atmosphere, thereby causing a vacuum which will balance the downward pull of the plunger. The plunger will remain raised until the tank is entirely empty, and until the vacuum above the same is broken by air entering through the openings 140. When the lifting pressure is removed from the bottom of the closure member 136 by the emptying of the tank, the same will slowly descend by its own weight, seats, and will be held tight by its own weight and the weight of the water in the tank. This slow closing action is entirely noiseless.

If desired, an annular seat can be provided on the inner side of the upper head of the member 131, to which contact can be made to a seat provided on the upper face of the plunger, at or near the outer periphery, thereby removing the necessity of an exact working fit between the plunger and the casing member 131.

With the use of my improvements, it will be seen that an extremely simple and inexpensive valve is provided, perfect in operation, and noiseless.

I have illustrated and described preferred and satisfactory forms of my invention, but it is obvious that changes may be made therein within the spirit and scope thereof as defined in the appended claims.

I claim:—

1. In a device of the character described, a bushing provided with a valve seat, a closure member adapted to rest on said valve seat in closed position of the valve, and to be raised to open the valve, a central overflow rod extending through said closure member and adapted to be raised and lowered therewith, and means closed at the top and open at the bottom adapted to exert a supporting force on the said closure member during emptying of the water from the tank, the said means adapted to release the said valve when the water in the tank drops below the means.

2. In a device of the character described, a bushing provided with a valve seat, a closure member adapted to rest on said valve seat in closed position thereof, and to be raised in open position, a central overflow rod extending through said closure member and adapted to be raised and lowered therewith, a housing member inclosing said closure member extending slightly above the raised position of said closure member, and provided in the lower portion thereof with ports adapted to establish communication between the tank and the said bushing in open position of the closure member, the periphery of said closure member slidably engaging the interior of said housing and adapted to form a substantial seal, and means in the said housing member adapted to be opened during the raising of the closure member to permit the closure member to expel the water therefrom.

3. In a device of the character described, a bushing provided with a valve seat, a closure member adapted to rest on said valve seat in closed position thereof, and to be raised in open position, a central overflow rod extending through said closure member and adapted to be raised and lowered therewith, a housing member inclosing said closure member, extending slightly above the raised position of said closure member, and provided in the lower position thereof with ports adapted to establish communication between the tank and the said bushing in open position of the closure member, the periphery of said closure member slidably engaging the interior of said housing and adapted to form a substantial seal, and means in the said housing member, adapted to be opened during the raising of the closure member to permit the closure member to expel the water therefrom, the said means being provided with means to permit the slow ingress of air and water to lower the said closure member after the emptying of the tank.

4. In a device of the character described, a bushing provided with a valve seat, a closure member adapted to rest on said valve seat in closed position thereof, and to be raised in open position, a central overflow rod extending through said closure member and adapted to be raised and lowered therewith, a housing member inclosing said closure member, and providing an open space above the said bushing adapted to establish communication between the tank and the said bushing in open position of the closure member, the periphery of said closure member slidably engaging the interior of said housing and adapted to form a substantial seal, and means adapted to be opened during the raising of the closure member to permit the closure member to expel the water from the said housing.

In testimony that I claim the foregoing as my invention, I have signed my name in presence of two subscribing witnesses.

THOMAS J. GANNON.

Witnesses:
 F. HOGG,
 JOS. BISBANO.

Copies of this patent may be obtained for five cents each, by addressing the "Commissioner of Patents, Washington, D. C."